Nov. 11, 1969  J. AARON  3,477,089
METHOD OF AND MEANS FOR COUPLING SHEET-LIKE MEMBERS
Filed May 17, 1967  4 Sheets-Sheet 1

INVENTOR
Jack Aaron
BY Polachek & Saulsbury
ATTORNEYS.

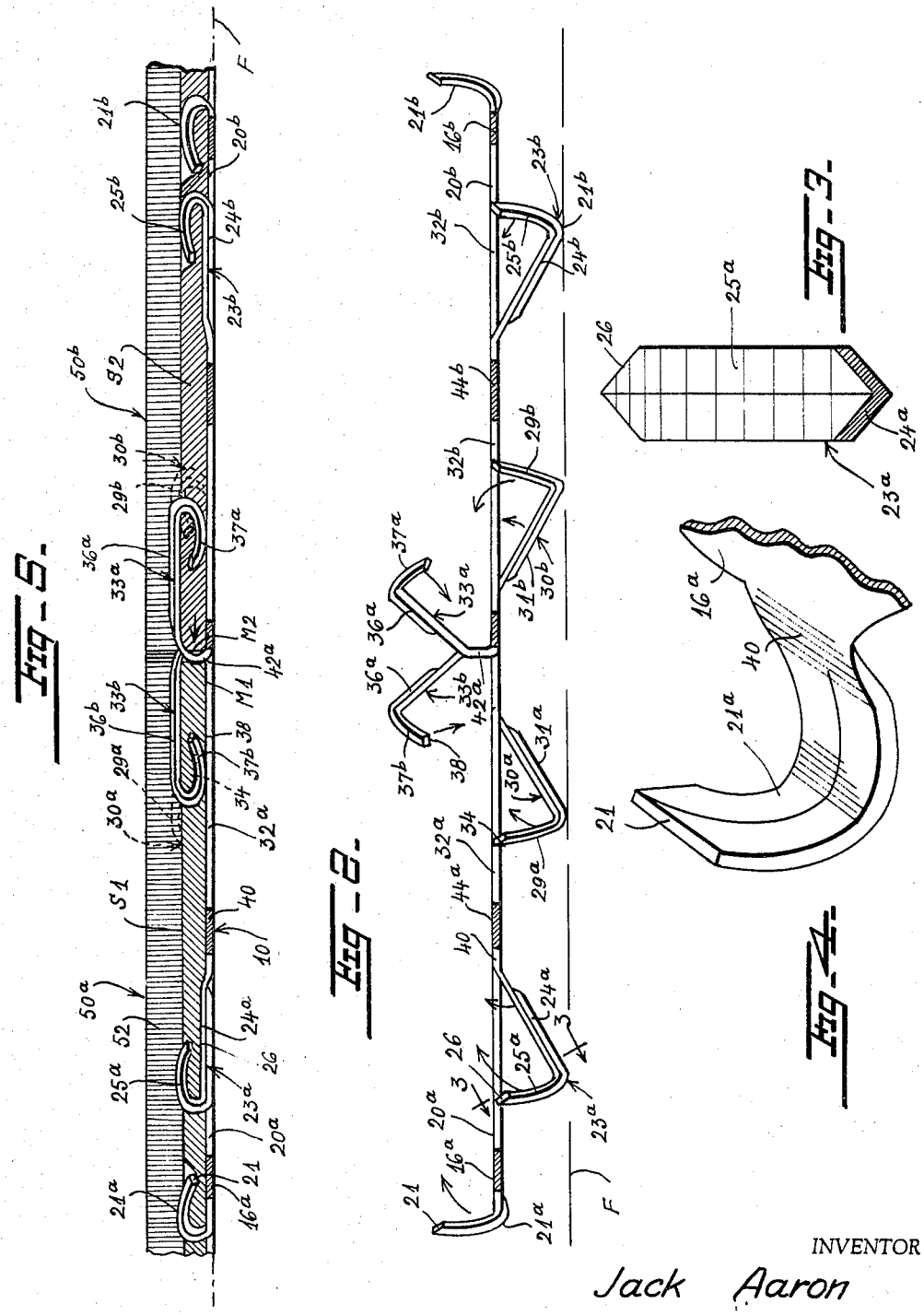

Nov. 11, 1969  J. AARON  3,477,089
METHOD OF AND MEANS FOR COUPLING SHEET-LIKE MEMBERS
Filed May 17, 1967  4 Sheets-Sheet 3
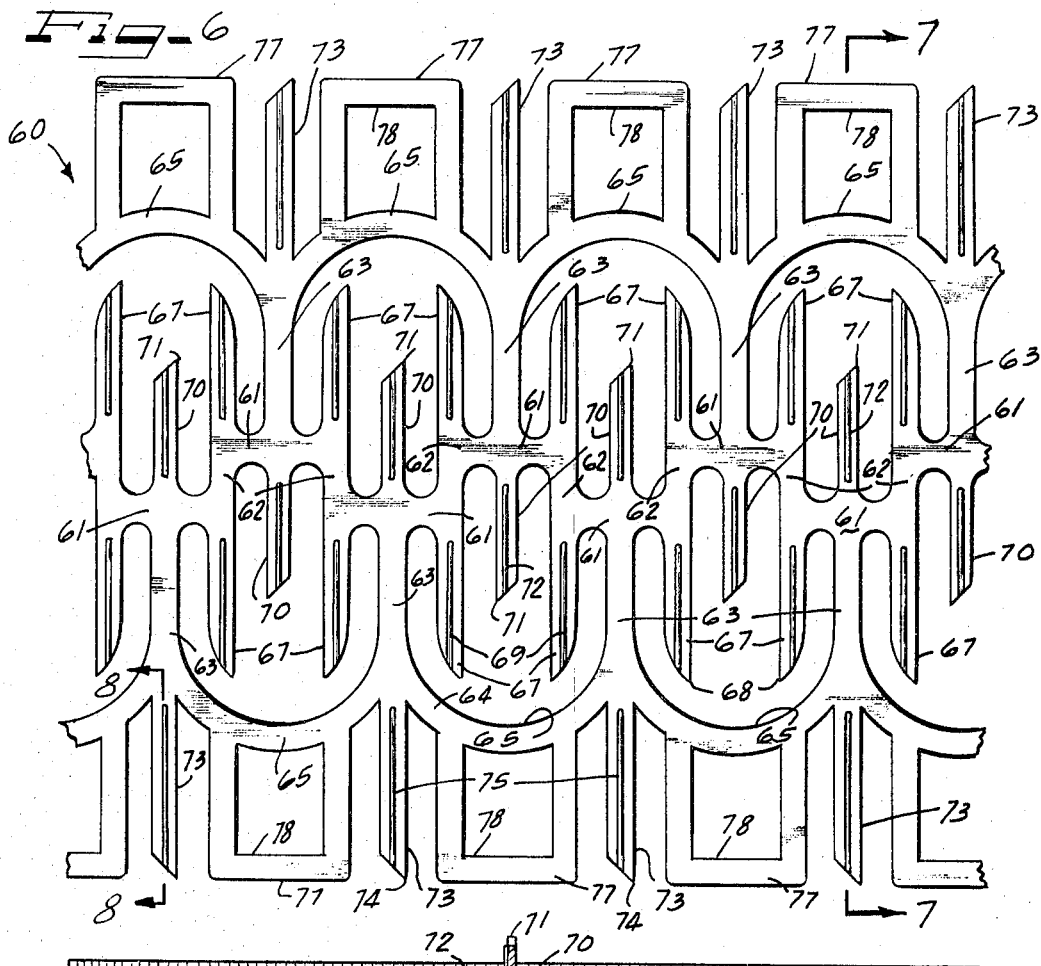
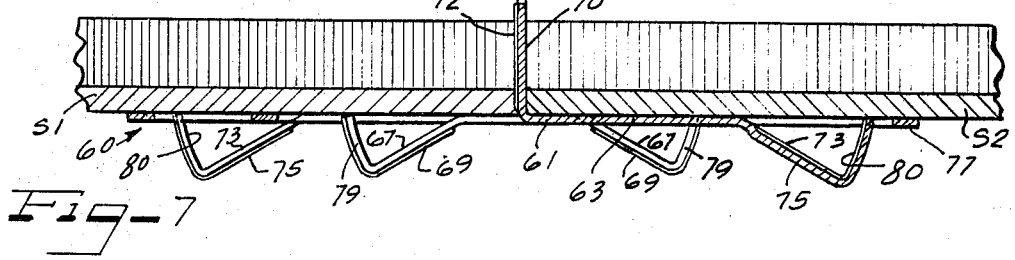
INVENTOR.
JACK AARON
BY  ATTORNEYS Nov. 11, 1969 J. AARON 3,477,089
METHOD OF AND MEANS FOR COUPLING SHEET-LIKE MEMBERS
Filed May 17, 1967 4 Sheets-Sheet 4

INVENTOR.
JACK AARON

United States Patent Office 3,477,089
Patented Nov. 11, 1969

3,477,089
METHOD OF AND MEANS FOR COUPLING SHEET-LIKE MEMBERS
Jack Aaron, Tustin, Calif., assignor, by mesne assignments, to Ralph R. Erlich, Michael N. Fine, Charles P. De Vito, and Albert P. De Vito, as trustees
Continuation-in-part of application Ser. No. 443,794, Mar. 30, 1965. This application May 17, 1967, Ser. No. 643,010
Int. Cl. A47g 27/04; A44b 9/00
U.S. Cl. 16—16                            20 Claims

ABSTRACT OF THE DISCLOSURE

Sheet-like members are joined in edgewise relation by assembling the adjacent margins thereof face-to-face against flat frame coupling strip structure having prongs which are driven through the plane of the strip face into securing relation in the margins.

---

This application is a continuation-in-part of my copending application Ser. No. 443,794, filed Mar. 30, 1965, now abandoned.

This invention relates to fastening of sheet-like members and in edgewise relation and is especially suitable for fastening together or seaming rugs and carpeting, but is also useful in joining of other sheet-like articles or members such as may be made of wood, leather, cardboard, fabric, and the like.

An advantage of the invention is that it avoids the use of adhesives, tacks, sewing and other fastening methods and materials which are costly and time-consuming to apply, which are subject to loosening and failure under continued stresses and strains, and which are objectionable for other reasons.

Heretofore, numerous and varied strip-like jointing devices have been proposed for fastening together the adjacent margins of sheet-like members of the characters indicated and utilizing adhesively secured fabric strips, combination of fabric strips and metal fasteners, metal strips with punched up prongs, and the like. Adhesives are messy to apply, require special curing techniques and equipment or substantial time to set, and in general are difficult to apply and effect uniform bond, especially in respect to rug and carpet backing, are subject to deterioration and loosening and failure, and otherwise objectionable. Metallic devices for this purpose as heretofore suggested have had numerous disadvantages, among which may be mentioned requirement to use multitudinous separate elements, need for critical skill in application, difficulty in handling prior to application, lack of uniformity in the resulting joint, etc. Continuous metal strips for this purpose as heretofore provided have lacked any ability to yield with stretching of fabric along a joint and it has therefore been necessary to pre-stretch the margins of fabric sheet-like articles such as carpeting.

An important object of the present invention is to provide a new and improved method of and means for coupling sheet-like members and which will overcome the foregoing and other disadvantages of prior methods and devices and which will provide simple, efficient, durable, easily practiced sheet joining or seaming.

Another object of the invention is to join sheet-like members or articles in edgewise relation without the use of adhesives, tacks, stitching or like fasteners, but simply by means of a self-contained coupling strip structure.

A further object of the invention is to provide a novel method of and means for coupling sheet-like members according to which the sheet edges are drawn together as the securing thereof is effected.

Still another object of the invention is to provide novel sheet coupling strip structure which, after the joint has been completed, will stretch or expand in length with the joined sheet margins.

Yet another object of the invention is to provide new means for entirely mechanically joining sheet-like members in edge-to-edge relation.

A still further object of the invention is to provide a new thin, lightweight, tensionable, low cost sheet coupling device which is adapted for rapid, accurate and positive edgewise joining of sheet-like members.

An additional object of the invention is to provide a new and improved coupling strip for the purpose indicated which accurately gages the relative position of the edge of the sheet to which attached.

According to the invention, sheet-like members are joined by providing a generally flat coupling strip having opposite faces of substantial width and with retaining prong means normally within the plane of one face of the strip, assembling a marginal portion of a sheet-like member in face-to-face relation against said one face of the strip, and driving the prong means through said face plane and into securing relation into the member.

Other objects, features and advantages of the present invention will be readily apparent from the following detailed description of certain preferred embodiments thereof, taken in conjunction with the accompanying drawings, in which:

FIGURE 2 is a cross-sectional view taken on line 2—2 of FIGURE 1;

FIGURE 3 is an enlarged sectional view taken through a prong on line 3—3 of FIGURE 2;

FIGURE 4 is an enlarged perspective view of a prong at one edge of the sheet joining strip;

FIGURE 5 is a sectional view similar to FIGURE 2 showing two carpet sections joined together in edgewise abutment by a sheet joining strip;

FIGURE 6 is a fragmentary plan view of a modified form of the sheet-joining or coupling strip;

FIGURE 7 is a transverse sectional view through the strip of FIGURE 6 and showing the same readied for coupling sheet members and with representative sheet members assembled therewith;

FIGURE 8 is an enlarged fragmentary longitudinal sectional detail view through one of the prong members taken substantially along the line 8—8 of FIGURE 6 and showing the prong member shaped preparatory to fastening it into a sheet member;

FIGURE 9 is a sectional detail view similar to FIGURE 7 but showing the prongs in member-fastening relation to the strip and the joined sheet members;

FIGURE 10 is a fragmentary enlarged plan view of a portion of the strip showing the prongs in the same condition as in FIGURE 9 but with the sheet members omitted for schematic or illustrative purposes;

FIGURE 11 is a fragmentary plan view of a modified form of the coupling strip in a form suitable for use in a hinge joint; and FIGURE 12 is a transverse sectional detail view taken substantially along the line 12—12 of FIGURE 11 and showing the prongs formed up preparatory to fastening engagement with a sheet-like member.

Figure 1:
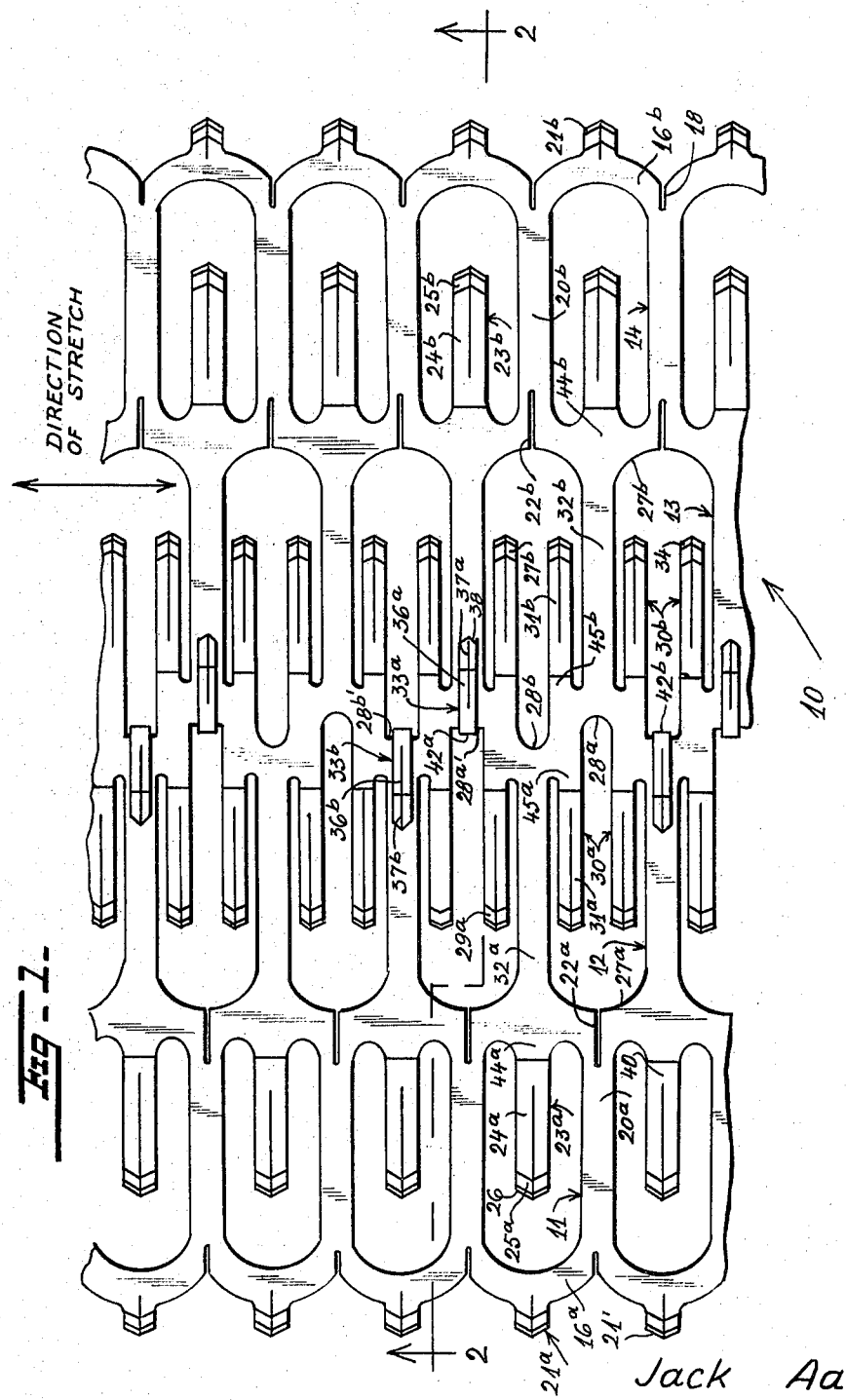
FIGURE 1 is a plan view of part of a sheet joining strip embodying the invention.

According to the invention there is provided a sheet-like member coupling fastener in the form of a strip 10 (FIGS. 1–4) of a unitary, self-contained construction having a skeleton frame body structure and which is adapted to be made from reasonably resilient sheet material such as thin sheet metal strip which can be readily punched to provides holes 11, 12, 13 and 14 in that order across the strip and aligned in respective longitudinal rows with the holes in each row offset relative to holes in the contiguous row or rows. Thus the holes 11 are staggered with respect to the holes 12 and the holes 12 adjacent to the holes 11 are staggered with respect to the holes 11 but aligned with the holes 14. The holes 13 located between the holes 12 and the holes 14 are staggered with respect to the holes 12 but aligned with the holes 12. The holes 13 located between the holes 12 and the holes 14 are staggered with respect to the holes 12 and 14 and are aligned with the holes 11. The holes 11 and 14 along the outer margins of the strip are generally rectangular in shape. Arcuate bar webs 16a, 16b extend in series along the respective outer lateral or marginal edges of the strip. Partial separation of the ends of the webs 16a, 16b is effected by short transversely inwardly extending slits 1. At their ends, the webs 16a, 16b connect integrally with transversely extending frame bars 28a, 29b, respectively.

Prong means are provided on the strip for retaining engagement with sheet-like members to be coupled, and in this instance comprising prongs 21a, 21b integrally formed on and extending from the outer end points of the arcuate webs 16a, 16b, respectively. These prongs have sharp points 21. At the inner ends of holes 11 and 14 are provided prongs 23a, 23b, respectively, which are desirably provided by material which is left within the holes in striking out the material therefrom. Shank portions 24a, 24b of the prongs 23a, 23b, respectively, are adapted to be offset from the back face of the strip, outwardly and downwardly inclined as shown, and are provided with prong end portions 25a, 25b, respectively, terminating in pointed ends and formed to extend in curved shape upwardly with the points located in the plane of the substantially flat skeleton frame body of the strip 10, and more particularly within the plane of the front or upper face of the strip.

For improved resilience longitudinally in the plane of the body of the strip, slits 22a, 22b extend outwardly of rounded ends 27a, 27b of the holes 12 and 13 and extend partway into the inner ends of alternate frame bars 20a, 20b, respectively. Narrow ends 28a of the holes 12 extend inwardly in generally offset overlapping relation to narrow ends 28a and extending into the holes 12 are respective pairs of prongs 30a, and similar prongs 30b are formed in straddling relation to the narrow ends 28b at the inner ends of the holes 13. Shanks 31a and 31b, respectively, are adapted to extend downwardly and outwardly, similar to the prong shafts 24a, 24b with prong end or terminal portions 29a of generally inwardly curved form and extending toward the body of the strip with points 34 within the plane of the upper face of the strip. It will be observed that the holes 12 are separated by transverse frame bars 32a aligned with the frame bars 20b while the holes 13 are separated by transverse frame bars 32b aligned with the frame bars 20a. Integrally formed at the inner ends 28a' of alternate ones of the holes 12 and aligned with the respective frame bars 32b are respective prongs 33a which are adapted to extend upwardly and are desirably angled generally outwardly into overlying relation with the longitudinally extending portions of the frame to which connected. Adapted to extend up from inner ends 20b' of the holes 13 and angled into overlying relation to the longitudinally extending frame portions to which they are connected are prongs 33b. These upstanding prongs have respective downwardly and inwardly curved terminal end portions 37a and 37b with sharp pointed tips 38.

Desirably, though not necessarily, the shanks and terminal portions of the prongs are crimped to a generally V-shaped cross section for reinforcement to provide a strong, rigid prong structure which tends to resist unintentional longitudinal and transverse bending distortion. Each of the prongs except the prongs 33a and 33b is desirably joined to the flat body of the strip by a short flat shank section 40 in the plane of the strip. The prongs 33a, 33b are joined to the strip body by vertical flat shank sections 42a, 42b, respectively.

Initially all of the prongs may lie in extended relation within the plane of the body of the strip so that the strip may be supplied to the user in a continuous roll from which required lengths of the strip can be peeled or rolled off in a suitable applicator apparatus or appliance for bench assembly work or in a portable machine for field application such as for joining carpet edges in laying carpet. In such apparatus suitable die means may be provided for forming up the several sets or series of prongs. On the other hand, if preferred, the strip 10 may be provided in predetermined lengths with the prongs all formed up in the ready positions or relationships thereof to the body as shown in FIGURE 2.

In joining two sheet-like members S-1 and S-2 which as shown are pieces of carpeting, but may be any other flat articles adapted to be coupled together by means of the strip 10, the strip will be suitably supported as by placing it on a flat floor or other rigid supporting surface F, or by supporting the body portion of the strip between the downwardly offset prongs, as preferred. Then the sheets S-1 and S-2 are assembled with the strip, with the sheet S-1 being placed over the left half of the strip with its margin M-1 abutting the flat vertical shank sections 42a as position gaging stops. The other sheet S-2 will be assembled over the right half of the strip 10 with its margin M-2 abutting the opposing sides of the shank sections 42b as position gaging tops, and wherein the sheets S-1 and S-2 are the bases or backings of carpet pieces 50a and 50b having pile 52.

The sheets S-1 and S-2 positioned in the assembly with the strip 10, as described, the prongs 21a and 21b will be inserted through the sheets by suitable pressing or driving force to stabilize and hold the sheets in place. At the same time or in sequence thereafter, the terminal portions of the prongs 23a, 23b and 30a, 30b are driven through the plane of the strip against which the sheets engage and into securing relation into the sheet members. This may be done with suitable die mechanism or by thrusting the body of the strip 10 with the sheets toward and against the supporting surface F, or by hammering downwardly against web portions 44a, 44b, 45a, 45b and the base ends of the prongs. As a result the shank sections 24a, 24b, 31a, 31b assume a generally horizontal position within the plane of the body of the strip, as shown in FIGURE 5. The prongs 21a, 21b and the prong terminal end portions 25a, 25b, 29a, 29b are then turned over and down on and into the sheets S-1 and S-2 to fasten the same. As this is accomplished, by hammering or die pressing action the prongs act to draw the margins of the sheets S-1 and S-2 toward the edges M-1 and M-2, respectively, to effect reasonably snug abutment of the sheet edges. At the same time, or in sequence, the initial position gaging prongs 33a, 33b are hammered or die pressed onto and into the abutted margins of the sheets with the terminal end portions 37a, 37b turning under on encountering the underlying frame bars 32b, 32a, respectively. After fastening the prongs through and into the sheets S-1 and S-2 has been completed, the sheets will be secured together in edgewise abutment with no apparent space between the edges M-1, M-2.

In the modification of FIGURES 6-10, a strip 60 is depicted which is especially suitable for installation in coupling sheet-like members by use of a machine especially devised for this purpose. To this end, the strip 60 is supplied in substantially transversely flat form in suitable rolls so that the strip can be fed out progressively into underlying assembly with contiguous coplanar sheet margins to be coupled. To this end, the strip 60 comprises a skeleton frame body provided with a generally sinuous central body web or bar structure comprising equal length alternately offset longitudinally extending sections 61 mutually connected with the contiguous relatively offset bar sections 61 by integral short transversely extending connections 62. Extending outwardly from the center of each of the central bar sections 61 is an integral bar 63 which joins integrally with the joining ends of respective arcuate bars 64 and each of which defines with the central bar a hole 65 of substantial size within which is accommodated, in each instance, a plurality of prong means. Within each of the holes 65 the prong means comprise respective prong bodies 67 comprising integral extension from the connecting portions 62. Each of these prong bodies has a terminal point 68. In addition, though not necessarily, each of the prong bodies 67 is reinforced by a longitudinally extending reinforcing rib 69 pressed therein. Also accommodated within the holes 65 is a respective prong body 70 projecting from the center of the bar section 61 which extends across the innermost side of the hole 65, and in allignment with the frame bar 63 which extends from the outer side of such frame bar section. Each of the prong bodies 70 has a terminal point 71 and is desirably, though not necessarily, reinforced by a longitudinally extending rib 72 pressed therein. Through this arrangement, two respective oppositely extending series of the prong bodies 67 are provided along the centrally extending bar of the strip body frame, as well as two respectively oppositely extending series of the prong bodies 70.

Along both margins of the strip 60 additional retaining prong means are provided, desirably comprising prong bodies 73 each of which comprises an integral outward extension from the skelton frame bar 63 with which it is aligned. Each of the prongs 73 terminates in a penetrating point 74, and is desirably provided with a longitudinal reinforcing rib 75. Thereby, the strip is provided with two additional longitudinally spaced series of retaining prongs and which, as will be observed in FIGURE 6, are in relatively staggered relation along the opposite margins of the strip.

Between the prongs 73 the strip margins are provided with lateral skelton frame extension bars 77 of desirably substantially U-shape in plan and attached at their opposite ends integrally with and comprising extensions from the respective ones of the arcuate frame bars 65. Each of the marginal frame bars 77 defined thereon with its companion frame bar 65 a generally rectangular hole 78. These holes 78 afford convenient opposite marginal and staggered sprocket or cog receiving openings by which the frame bars serve as indexing feed guides for the strip through automatic assembling mechanism within which the several series of prongs are die shaped from a normally flat condition within the plane of the strip preparatory to fastening into sheet-like members assembled with the strip and then are driven into such members. In addition, the frame bars 77, together with the frame bars 65 afford a skelton frame base or platform against which the sheet-like members to be coupled, and more particularly marginal portions of such members, are assembled for, and are retained after, coupling.

In preparation for coupling sheet-like articles or members, the strip 60 has the several prong means thereof formed up in suitable die structure. This may be done throughout the length of the strip, if preferred, but in automatic applicator apparatus, such as may be used in carpet laying, forming of the prong means may be, and desirably is, accomplished along progressive sections of the strip immediately preceding fastening the coupling strip to the sheet-members assembled therewith. In any event, in the prepared strip or prepared section of the strip, the two relatively staggered central series or sets of prongs 70 are bent up (FIG. 7) to extend normal to the plane of the upper or member receiving face of the strip and with all of the prongs 70 aligned in a common vertical plane. Concurrently therewith, the two inner series of prongs 67 are formed to extend in a generally oblique offset relation to the lower or back face of the strip, and terminal portions 79 thereof are bent up and preferably, though not necessarily, arcuately and with the tips at least substantially within the plane of the strip and more particularly the front or member-receiving face thereof. Similarly, the two outer series of prongs 73 are bent into offset obliquely outwardly extending relation relative to the back face of the strip and are formed with angular and preferably slightly arcuately curved terminal portions 80 (FIG. 8) which have the tips thereof located within the plane of the strip and more particularly substantially within the plane of the front face of the strip (FIG. 7). This arrangement leaves the front or upper face of the strip clear outwardly from the upstanding central prongs 70 to serve as platform areas receptive of the edgewise adjoining marginal portions of the respective sheet-like members S–1 and S–2 shown as carpeting, but which may be any other members which may suitably be coupled in this manner by means of the strip. In assembling the members S–1 and S–2 with the strip, the central upstanding prongs 70 serve as convenient edge gages so that the members will be properly aligned equally upon and along the strip.

After the strip with the several sets of prongs formed up as described has been assembled with the margins of the two members S–1 and S–2, the sets of prongs 67 and 73, and more particularly the terminals 79 and 80 thereof, are driven through the plane of the strip body frame and particularly the plane of the front or member-engaged face, and into securing relation with the members, which is accomplished by returning the divergent, generally offset body portions of the prongs to substantially the original position thereof within the plane of the body skeleton frame of the strip 60. By having the tips of the terminal portions 79 and 80 enter the members S–1 and S–2 at respective positions spaced outwardly relative to the longitudinal center of the assembly and to a slightly greater length than the body length of the respective prongs, there is a laterally inward drawing of the margins of the coupled members to place the contiguous edges into reasonably firm abutment to substantially eliminate gap therebetween. Concurrently with such driving in of the prong terminals, or after such driving has been completed and the terminals project substantially into or through the body portions of the respective coupled members, in this instance the backing of the carpeting, the terminals are bent over inwardly into clenching relation to the engaged member. This is preferably effected by curling the terminals substantially as shown in FIGS. 9 and 10, whereby the material of the engaged member is secured against escape from the respective prongs. In this the tips of the prong terminals are desirably thrust inwardly against the body portions of the respective prongs. Concurrently with, or separately from the turning over, clenching upsetting of the prong terminals 79 and 80, the central prongs 70 are bent over and curled into clenching relation to the respective coupled members, with each of the prongs 70 being bent over onto its associated central bar section 61 or the adjacent aligned end portion of the transverse bar 63. Desirably, this clenching curling action is such as to draw the margin of the engaged coupled member toward the joint, supplementary to the action of the prongs 67 and 73, in biasing the margins inwardly.

In FIGURES 11 and 12 an adaptation of the coupling strip structure is shown providing for a hinged connection, as may be useful in situations where it is desirable to facilitate folding of wide runner strips, large rugs that must be taken up, luggage covers or flaps, and the like. To this end, strips 90 are provided which may be of any preferred length and which are constructed in substantially butt hinge arrangement for assembly with a like strip for coupling together the respective margins of sheet-like members. For this purpose, the strip 90 is made as a continuous self-contained unit from strip material and comprises a skelton frame comprising a coupling joint bar 91 having at uniformly spaced intervals longitudinally aligned respective hinge curls 92, the ends of which are spaced apart approximately the same as the length of the individual curls. These hinge curls are offset to the backside of the strip. Extending from adjacent to each opposite end of each of the hinge curls 92, the bar 91 has an angular offsetting portion 93 extending divergently generally toward the opposite edge of the strip and joined together by an integral offset connecting portion 94 by which the bar extends continuously in a sinuous form from end to end of the strip. Joined to the joining portions 94 are a continuous series of outwardly arcuate bars 95 which define with the bar 91 and its portions 93 and 94 respective holes 97 into which extend a pair of spaced prongs 98 rooted to the hinge-carrying portion of the bar 91. Each of the bars 98 has a point 99. Extending in the opposite direction across a plane through the hinge curls 92 is a series of central prongs 100 each of which has a point 101, one of each of the prongs 100 being rooted to each of the joining portions 94 of the strip. Aligned with each of the prongs 100 and extending in the opposite direction is a prong 102 integral with the juncture of the respective adjacent bars 95 and each having a point 103. Extending outwardly from each of the bars 95 is a generally U-shaped bar 104 defining a generally rectangular hole 105 adapted to serve as a sprocket or cog receiving indexing feed guide opening, while the bar serves the additional function of part of the meber-receiving platform or base of the coupling strip.

In preparing the coupling strip 90 for attachment to a sheet-like member, the prongs 98 and 102 are offset from the back face of the frame of the strip to extends in a generally oblique direction outwardly, substantially as shown in FIG. 12, and are formed with a respective angular terminals 107 and 108, desirably slightly curved inwardly and with their tips substantially within the plane of the frame, and more particularly the front or member receiving face. In addition, the central prongs 100 are bent up in a plane normal to the plane of the strip and on the center line of the hinge curls 92 to extend from the front face of the strip. Desirably, the prongs 100 are provided with a section 100a which diverges in overlying relation obliquely over the face plane of the strip and terminates in a generally outwardly turned, preferably slightly curved terminal 109 projecting toward and spaced from the front face of the strip at least a distance equal to and preferably slightly greater than the thickness of the margin of a member to be secured thereby for attaining a coupled relationship. Through this arrangement, the normally extending portions of the prongs 100 serve as edge alignment gaging stops for the sheet-like member to be secured and toward which the edge of the member is retainingly thrust upon driving the several terminals 107, 108 and 109 thereinto and clenching the terminals toward the underlying areas of the strip frame. Upon coupling the hinge curls 92 of the strips 90 which have been attached to the respective margins of sheet-like members to be joined in edge-to-edge relation, it will be observed that the members may be hingedly folded onto one another about the joint and when they are laid out in coplanar relation the edges are joined together in substantially gap-free relation.

All forms of the invention are adapted to be made from relatively inexpensive strip stock. Although, where desired non-rusting or corroding materials such as stainless steel, bronze, or like stock may be used, low cost cold rolled steel is a more economical material both as to initial cost and ease and speed or die forming. It has good work hardening characteristics, and where rusting must be guarded against, it may easily and inexpensively be coated or rustproofed. In all forms of the invention, the punching out is desirably effected so that the burrs are on the front or article-receiving face of the strip and on the inner, gripping faces of the prongs, whereby retention of the sheet-like member or members is enhanced and exposed rough edges in the coupled assembly are pavoided. In view of the thinness of the frame of the coupling strip and the thoroughly clenched relationship of the prong terminals lumpiness or objectionable elevation or raised areas in the joint are avoided. Further, the openwork skelton frame, while affording adequate strength to avoid undesirable deformation is light in weight and because of its resilient flexibility permits rolling up of the assembly, such as a rug or carpet or runner strip when desired.

The construction and relationship of the various parts of the coupling strip are such that the advantages of expanded metal in regard to the stretchability are attained, and also the advantages of substantially staple-like connection of the edgewise or butt joint are attained, all in a continuous strip form. A particular advantage of the longitudinal stretchability of the strip resides in that for articles or members such as carpeting, it is not necessary to prestretch the members along the join, but merely to have them connected together in wrinkle-free edge-to-edge abutment along the seam, and then the seam may be stretched as desired along the length thereof, as may occur when the carpet is attached to a floor, which generally involves stretching the carpet by means of carpet-laying tools used for this purpose. As a matter of fact, any such stretching longitudinally along the seam provided by the coupling strip only enhances the snugness of the joint at the abutting edges. This is diagrammatically illustrated in FIGURE 10. Stretching the margins of the coupled members along the seam may occur readily without any wrinkling or bunching up or curling at any point therealong because the surved bars 65 may yield toward a straightening thereof and thus permit elongation of the strip to follow the stretching. Further, as a result of the stretching of the coupled margins, the clenched prongs 67 tend to follow the material of the secured member as generally indicated by the longitudinal directional arrows and the relative displacement of these prongs as shown on comparison of the full line displaced positions thereof with respect to the normal dot-dash outline positions. This results in a leverage action wherein the connecting portions 62 operate to draw the sections 61 of the central bar toward the point, with a corresponding drawing in of the lateral portions of the strip attached thereto toward the joint with an efficient drawing together of the joined edges of the members. Thus tensioning of the coupled margins of the members actually improves the tightness of the joint as a result of the longitudinal stretchability of the strip accompanied by transverse draw in, i.e., contraction.

Moreover, as the sinuous bar structure of the strip contiguous to the sheet-like member margin edge or edges tends to straighten under longitudinal stretching tension, the central clenched prongs bias the respective margins toward their edges, and the abutted edges are biased into tighter engagement.

Another advantageous feature resides in that after the central prongs 33a, 33b, 70 or 100 are in each instance clenched in hook-like fashion into the respective sheet-like member margins, the edge portions of the margins are thoroughly bound against the respective coupling strips and positively hold the edge portions of the margins against displacement from a coplanar relation.

It will be understood that variations and modifications may be effected without departing from the spirit and scope of the novel concepts of this invention.

I claim as my invention:

1. Structure for joining sheet-like members, comprising:
   a generally flat coupling strip having opposite faces of substantial width, against one of which faces a margin of a sheet-like member is adapted to be assembled in face-to-face relation;
   and retaining prong means on said strip having penetrating tips normally within and pointing toward the plane of said one face and thereby adapted to be driven through said plane and into securing relation with said margin after said assembly thereof with said one face.

2. The structure of claim 1, having edge stop gaging means thereon, and said prong means having body portions and terminal portions extending angularly therefrom and having said tips thereon spaced from said stop gaging means a greater distance than the length of said body portions when the tips are within said plane and being thereby operative on being driven into said securing relation with said margin to bias said margin in edgewise relation toward said stop gaging means.

3. The structure of claim 2, in which said edge stop gaging means comprise prongs standing from said one face and adapted to be clenchingly engaged with said margin.

4. The structure of claim 1, in which said prong means include portions offset from the opposite face of said strip and having angular terminals with angular terminals such that the tips thereof are adjacent to said one face.

5. The structure of claim 4, in which said strip comprises thin sheet metal, and said prong portions and terminals have longitudinal reinforcing rib means therein.

6. The structure of claim 4, in which said strip has edge stop gaging means thereon for opposition to an edge of said margin, said prong means portions extend generally away from said stop gaging means, said terminal tips being located further from said stop means than the ends of said prong portions from which the terminals extend angularly, and said prong means portions being swingable toward said plane as the terminals are driven therethrough and into said margin, whereby said terminals effect a bias of said margin toward said stop means concurrently with being driven into said securing relation with said margin.

7. A structure as defined in claim 1, in which said strip comprises a skeleton frame having frame bars defining holes therethrough and said prong means extending from said frame bars within said holes.

8. A structure as defined in claim 7, in which said frame bars include longitudinal and transverse portions, whereby said strip is longitudinally stretchable.

9. A structure as defined in claim 7, in which said frame comprises an arrangement of generally longitudinally extending bars and transversely extending connecting portions affording longitudinal stretchability and concurrent transverse contraction, and said prong means having a leverage relationship to said bars enhancing the contraction responsive to deflection of the prong means in the longitudinal direction of the strip as by tensioning of said margin after securing of said margin to the strip by said prong means.

10. A structure as defined in claim 1, in which said strip has opposite margins, said strip margins having respective longitudinal series of holes therethrough, and the holes of one series being staggered with respect to the holes of the other series.

11. Structure as defined in claim 1, in which said strip has a margin, and hinge curl means along said margin.

12. Structure as defined in claim 1, in which said strip comprises die stamped sheet metal and has a skeleton frame of interconnected bars from which said prong means project integrally, said bars and prong means having strikeout burr edge corners along said one face whereby to enhance securement of said margin with the strip.

13. A structure as defined in claim 1, in which said strip is adapted for joining two sheet-like members in edgewise abutment and comprises a frame-like body of substantial length to seam the joint at abutted edges of said members and of a width equal to the combined width of predetermined width margins of said members, said prong means comprising a first plurality of series of prongs spaced apart transversely of said body and the prongs in each series being spaced apart longitudinally of said body with each prong having a shank extending angularly from the remaining face of said strip and provided with a longitudinally curved terminal portion extending toward said plane for engaging with said members, a second plurality of series of prongs spaced apart transversely of said body and with the prongs in each of the second series spaced apart longitudinally of said body and having longitudinally curved ends extending from said one face, and a third series of prongs spaced apart longitudinally of said body and having shanks extending from said one face in position to be engaged with the edges of said members and adapted to be clenched onto said margins adjacent to said edges of the members.

14. The structure of claim 1, in which said strip is adapted for joining two sheet-like members in edgewise abutment and comprises a frame-like body of substantial length to seam the joint at abutted edges of said members and of a width equal to the combined width of predetermined width margins of said members, said prong means comprising first and second series of prongs along opposite lateral edges of said body, said body having first and second series of outer generally rectangular holes adjacent to said first and second series of prongs respectively, said body having third and fourth series of inner generally rectangular holes adjacent inner ends of the first and second holes respectively and each of such holes being defined by two generally straight spaced frame bars extending transversely of said body with bar webs connecting opposite ends of the spaced bars, third and fourth series of prongs having shanks extending angularly away from and laterally outwardly relative to the remaining face of said strip body and located at the inner ends of the first and second series of holes respectively, each of the prongs of said thrid and fourth series having terminals with sharp tips at their respective ends located adjacent to said plane, fifth and sixth series of prongs having shanks extending from said body at the inner ends of alternate ones of the third and fourth series of holes, said fifth and sixth series of prongs having sharp points and being adapted to be engaged by the edges of the members and to have said sharp points diven into the margins of the members adjacent to said edges and to draw said margins into close edgewise abutment.

15. A structure as defined in claim 1, in which said strip is adapted for joining two sheet-like members in edgewise abutment and comprises a frame-like body of substantial length to seam the joint at abutted edges of said members and of a width equal to the combined width of predetermined width margins of said members, said body having first and second series of outer generally rectangular holes, first and second series of prongs respectively adjacent to said first and second series of holes, said body having third and fourth series of generally rectangular holes adjacent to the inner ends of the first and second series of holes respectively and each of said third and fourth series holes being defined by two generally straight spaced frame bars extending transversely of said body with web bars connecting opposite ends of the spaced frame bars, third and fourth series of prongs having shanks extending laterally outwardly relative to said body and from opposite face of the body and connected to the body at the inner ends of the third and fourth series of holes, fifth and sixth series of prongs having shanks extending laterally outwardly and away from said opposite face of said body adjacent to the inner ends of said third and fourth series of holes respectively, each of the prongs having a sharp tip at its end for penetrating the members to be joined by said strip.

16. The structure of claim 15, including seventh and eighth series of prongs on said body and adapted for clenching engagement with said margins of the members respectively.

17. Structure for joining sheet-like members in edgewise abutment, comprising:
strip means extending along one face of margins of the members contiguous to the abutting edges of the members;
and prong means extending from said strip means between said edges and clenched in hook-like fashion into the respective margins and thereby binding the margins against the strip means and positively holding the edge portions of the margins against displacement from a coplanar relation.

18. The structure of claim 17, in which said strip means comprise a sinuous bar having said prong means thereon in longitudinally spaced relation on successively lateral relatively offset portions of the bor, said bar tending to straighten under longitudinal stretching tension whereby the clenched prong means bias the respective margins toward their edges.

19. Structure for joining sheet-like members, comprising:
a generally flat coupling strip having opposite faces of substantial width, against one of which faces a margin of a sheet-like member is adapted to be assembled in face-to-face relation:
said strip comprising a skeleton frame comprising a central longitudinally extending generally sinuous bar;
transversely outwardly extending bars integral with the central bar;
arcuate bars integrally connecting the outer ends of said transverse bars; and
prong means extending in respective longitudinally spaced sets outwardly transversely from said central bar and between said transverse bars and adapted to be driven into securing relation with said margin upon assembly of said margin with said one face.

20. The structure of claim 19, in which said arcuate bars define longitudinal marginal portions of the strip, and additional prong means extending outwardly along said marginal portions.

References Cited

UNITED STATES PATENTS

| | | | |
|---|---|---|---|
| 2,726,419 | 12/1955 | Saks et al. | 16—16 |
| 3,029,173 | 4/1962 | Reinhard | 16—16 |
| 1,261,166 | 4/1918 | Ritchie | 24—36 |
| 3,314,119 | 4/1967 | Hill | 16—16 |
| 372,632 | 11/1887 | Meacom | 24—36 |

BOBBY R. GAY, Primary Examiner

D. L. TROUTMAN, Assistant Examiner

U.S. Cl. X.R.

24—87